(12) United States Patent
Stables et al.

(10) Patent No.: US 12,664,469 B2
(45) Date of Patent: Jun. 23, 2026

(54) GENERATING SEGMENTS BASED ON PROPENSITY SCORES CONFIGURED VIA A TEMPLATED MODEL BUILDER EXPERIENCE

(71) Applicant: Salesforce, Inc., San Francisco, CA (US)

(72) Inventors: Heather Phillips Stables, Woodstock, GA (US); Paul Joseph Nix, Indianapolis, IN (US); Tejas Sanghavi, Palo Alto, CA (US); Jonathan Daniel Showers Belkowitz, New York, NY (US); Amrutha Krishnan, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 713 days.

(21) Appl. No.: 18/064,598

(22) Filed: Dec. 12, 2022

(65) Prior Publication Data

US 2024/0193466 A1     Jun. 13, 2024

(51) Int. Cl.
*G06N 20/00* (2019.01)
*G06F 18/40* (2023.01)

(52) U.S. Cl.
CPC ............. *G06N 20/00* (2019.01); *G06F 18/41* (2023.01)

(58) Field of Classification Search
CPC ................................ G06N 20/00; G06F 18/41
See application file for complete search history.

(56) References Cited

U.S. PATENT DOCUMENTS

| | | | | |
|---|---|---|---|---|
| 6,038,555 | A * | 3/2000 | Field | G06Q 20/403 706/15 |
| 11,017,321 | B1 * | 5/2021 | Mishra | G05B 23/0283 |
| 2008/0168011 | A1 * | 7/2008 | Steinberg | G06F 16/2365 706/12 |
| 2009/0106178 | A1 * | 4/2009 | Chu | G06N 5/02 706/14 |
| 2010/0115446 | A1 * | 5/2010 | Fastabend | G06F 16/2423 715/781 |
| 2011/0029467 | A1 * | 2/2011 | Spehr | G06Q 30/02 706/13 |
| 2014/0046880 | A1 * | 2/2014 | Breckenridge | G06N 20/00 706/12 |
| 2019/0037036 | A1 * | 1/2019 | Sunkara | G06Q 30/0204 |
| 2020/0193234 | A1 * | 6/2020 | Pai | G06F 16/904 |
| 2021/0334471 | A1 * | 10/2021 | Silverstein | G06F 40/30 |
| 2023/0025371 | A1 * | 1/2023 | Syed | G06Q 10/0631 |

* cited by examiner

*Primary Examiner* — Phenuel S Salomon
(74) *Attorney, Agent, or Firm* — Holland & Hart, LLP.

(57) ABSTRACT

Methods, systems, apparatuses, devices, and computer program products are described. A data service may receive a first user input indicating a first set of entities for training an artificial intelligence (AI) model for propensity score-prediction. The data service may receive a second user input indicating a set of outcome conditions which define what a user would like to predict about a customer (e.g., propensity to purchase). The data service may generate the AI model accordingly, and based on executing the AI model, generate a set of prediction metrics (propensity scores) for a second set of entities. The data service may store an indication of the AI model for review by a user. When the user approves the AI model and publishes the AI model to the data service, the generated propensity scores may be used to generate a segment of entities of the second set of entities.

20 Claims, 9 Drawing Sheets

110-a 130-a 110-b 130-b 105-a 105-b 105-c 130-c 110-c 130-d 110-d

Data Center

120

140

Cloud Platform

135

115

125

100

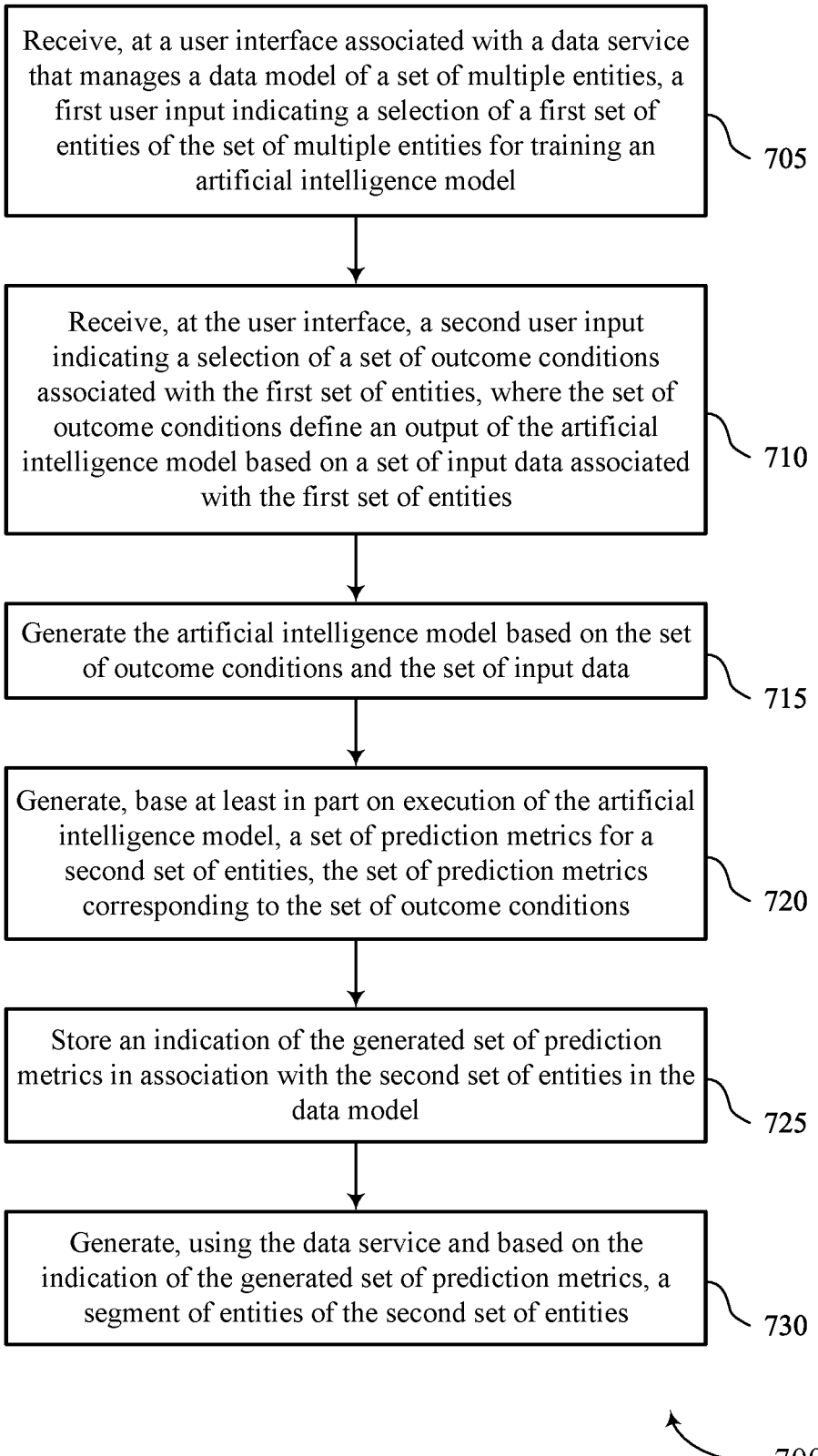

Receive, at a user interface associated with a data service that manages a data model of a set of multiple entities, a first user input indicating a selection of a first set of entities of the set of multiple entities for training an artificial intelligence model

705

Receive, at the user interface, a second user input indicating a selection of a set of outcome conditions associated with the first set of entities, where the set of outcome conditions define an output of the artificial intelligence model based on a set of input data associated with the first set of entities

710

Generate the artificial intelligence model based on the set of outcome conditions and the set of input data

715

Generate, base at least in part on execution of the artificial intelligence model, a set of prediction metrics for a second set of entities, the set of prediction metrics corresponding to the set of outcome conditions

720

Store an indication of the generated set of prediction metrics in association with the second set of entities in the data model

725

Generate, using the data service and based on the indication of the generated set of prediction metrics, a segment of entities of the second set of entities

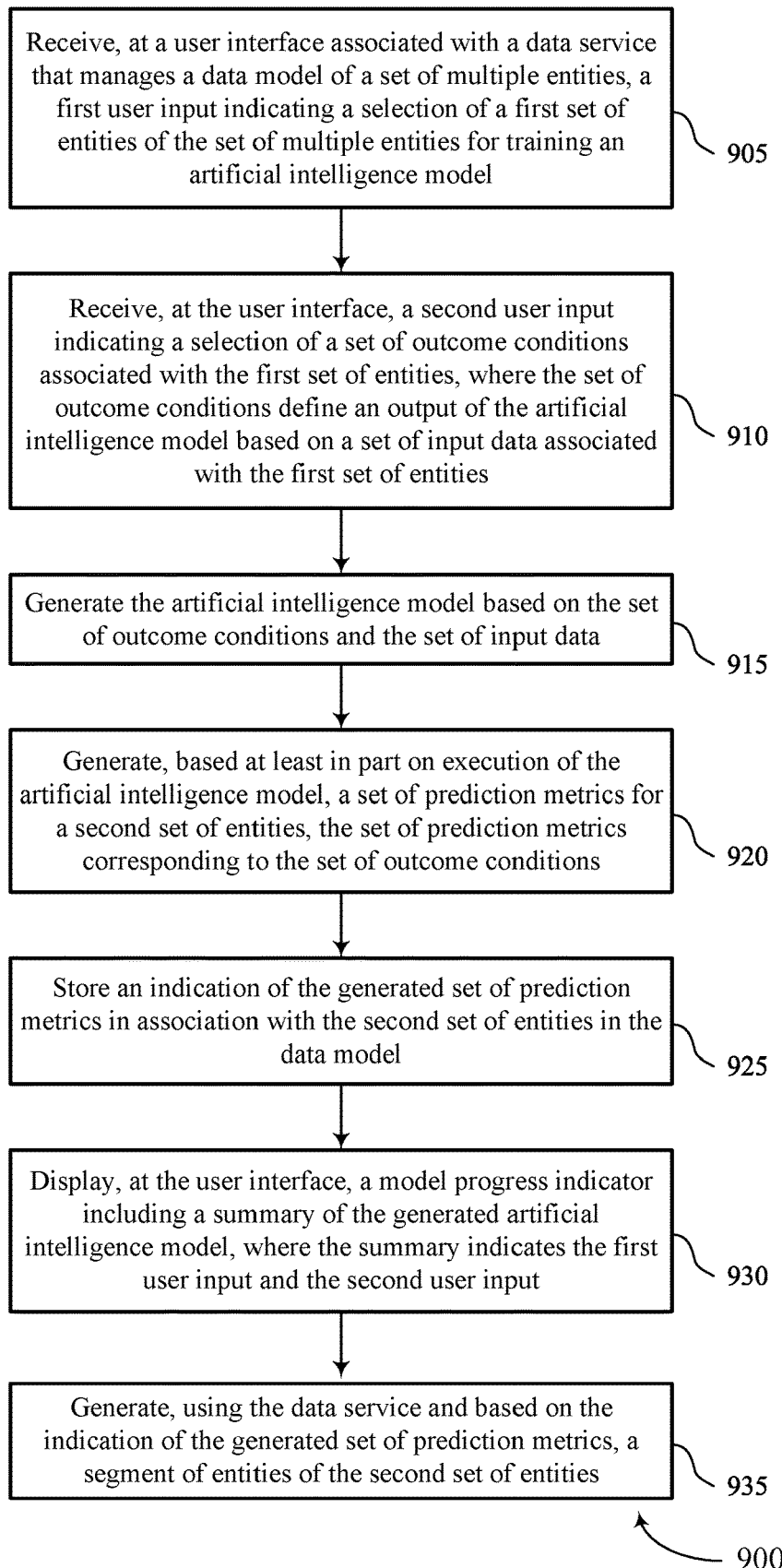

Receive, at a user interface associated with a data service that manages a data model of a set of multiple entities, a first user input indicating a selection of a first set of entities of the set of multiple entities for training an artificial intelligence model

905

Receive, at the user interface, a second user input indicating a selection of a set of outcome conditions associated with the first set of entities, where the set of outcome conditions define an output of the artificial intelligence model based on a set of input data associated with the first set of entities

910

Generate the artificial intelligence model based on the set of outcome conditions and the set of input data

915

Generate, based at least in part on execution of the artificial intelligence model, a set of prediction metrics for a second set of entities, the set of prediction metrics corresponding to the set of outcome conditions

920

Store an indication of the generated set of prediction metrics in association with the second set of entities in the data model

925

Display, at the user interface, a model progress indicator including a summary of the generated artificial intelligence model, where the summary indicates the first user input and the second user input

930

Generate, using the data service and based on the indication of the generated set of prediction metrics, a segment of entities of the second set of entities

GENERATING SEGMENTS BASED ON PROPENSITY SCORES CONFIGURED VIA A TEMPLATED MODEL BUILDER EXPERIENCE

FIELD OF TECHNOLOGY

The present disclosure relates generally to database systems and data processing, and more specifically to generating segments based on propensity scores configured via a templated model builder experience.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may support systems that are used to create, manage, and update communication process flows. For example, a communication process flow management service may be used to design and implement communication process flows that control communications between a tenant and a set of users (e.g., subscribers). In addition, a separate service, such as a data platform, may support segmentation of entities based on attributes associated with the entities. The data service may output predictive engagement scores which may be used to create a communication process flow, where the data service may source the scores from a separate system using user engagement data. However, these scores may fail to consider user profile data available within the data service and may fail to predict a likelihood of a user action. Moreover, the scores may not be configurable by an end user.

BRIEF DESCRIPTION OF THE DRAWINGS

FIGS. 7 through 9 illustrate flowcharts showing methods that support generating segments based on propensity scores configured via a templated model builder experience in accordance with aspects of the present disclosure.

DETAILED DESCRIPTION

Figure 1:
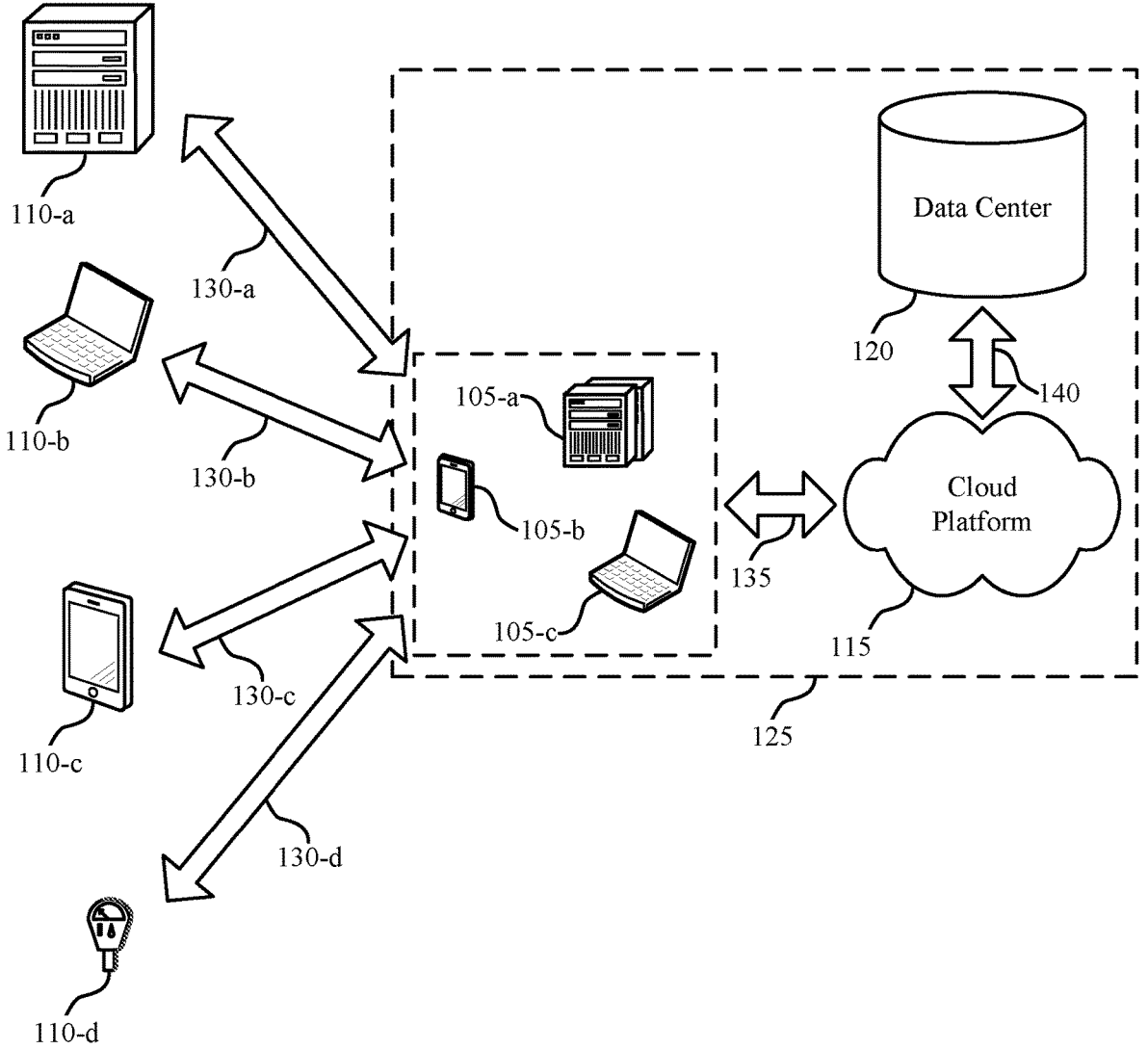
FIG. 1 illustrates an example of a data processing system that supports generating segments based on propensity scores configured via a templated model builder experience in accordance with aspects of the present disclosure.

A communication process flow management service may support creation, configuration, management, and deployment of a communication process flow (sometimes referred to as a "journey") that manages communications between a tenant or organization and a set of users. For example, an organization or tenant may use the communication process flow management service to schedule and manage communications between the organization and the set of users, which may be examples of subscribers, customers, or prospective customers of the organization. Users may receive electronic communications (e.g., emails, messages, advertisements, marketing campaigns) according to a communication process flow. The communication process flow may include various actions and message configurations, and transmission of various communications may depend on user attributes and user web behavior, among other parameters.

A data service (e.g., customer data platform (CDP)) may support segmentation of entities (corresponding to users) based on attributes (e.g., age, gender, purchase history) associated with the entities, where the attributes may be identified by ingesting data from multiple data sources. Administrative users or employees associated with the tenant (e.g., a marketing team) may manually or automatically adjust aspects of the communication process flow for communication management, for example, using the data from the data platform. The data service may use user engagement data from outside sources to output predictive engagement scores that indicate a user's engagement, for example, with a product. However, these scores may fail to consider user profile data already stored within the data service and may fail to predict a likelihood of a user's actions (e.g., product purchase, churn, or conversion), nor are the scores configurable by an end user.

Techniques described herein support segment generation based on propensity scores (e.g., prediction metrics) configured via a templated model builder experience. For example, the techniques described herein support a templated, no-code artificial intelligence (AI) model builder that enables a user (e.g., an administrative user or an employee associated with a tenant) to define what metrics they would like to predict based on specified output conditions. That is, the user may use an AI model to predict purchase, churn, conversion, and other propensity scores for particular products, product categories, and the like. The AI model may use inputs including a scoring audience (who may be evaluated), a training audience (for training the AI model), and relevant entities and attributes associated with the audiences. When the AI model is configured, the user may view output quality and propensity score distributions for their customers, and once satisfied with the results, may choose to publish the model and enable it for use in segmenting entities based on the propensity scores. In this way, users may use custom propensity scores to create segments, where the users may customize their propensity predictions according to different scenarios.

Aspects of the disclosure are initially described in the context of an environment supporting an on-demand database service. Aspects of the disclosure are then described in the context of computing architectures and process flows. Aspects of the disclosure are further illustrated by and described with reference to apparatus diagrams, system diagrams, and flowcharts that relate to generating segments based on propensity scores configured via a templated model builder experience.

FIG. 1 illustrates an example of a system 100 for cloud computing that supports generating segments based on propensity scores configured via a templated model builder experience in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may be an example of a multi-tenant system. For example, the system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

The cloud platform 115 and/or subsystem 125 may support a data service 205. The data service (e.g., CDP) may support segmentation of entities (corresponding to users) based on attributes (e.g., age, gender, purchase history) associated with the entities, where the attributes may be identified by ingesting data from multiple data sources. The data service may be associated with the data center 120. Administrative users or employees associated with the tenant (e.g., a marketing team) may manually or automatically adjust aspects of the communication process flow for communication management, for example, using the data from the data platform. The data service may use user engagement data from outside sources to output predictive engagement scores that predict a user's engagement, for example, with a product. The user engagement data (e.g., quantities of email opens, link clicks, and the like) may be sourced from a marketing platform, and may be included in email or mobile push datasets (e.g., bundles) for the data platform. The predictive engagement scores may be surfaced to an application or program for generating entity segments.

Although predicted channel engagement may be valuable in some scenarios, the predictive engagement scores fail to take into account user profile data already stored within the data service and may fail to predict a likelihood of a user's actions (e.g., product purchase, churn, or conversion). Moreover, a user may lack the ability to configure the scores, which may limit the scope of entity segmentation based on such scores. Additionally, the user profile data stored in the data service may be available for modeling, however current predictive engagement scores may be based only on engagement data. Ingesting the user profile data in addition to the engagement data may present a more complete view of a customer, improving predictive capabilities and improving the configuration of communication process flows such that they send content via correct channels and at correct times to intended users.

Techniques described herein support segment generation based on propensity scores (e.g., prediction metrics) configured via a templated model builder experience. For example, the techniques described herein support a templated, no-code AI model builder that enables a user (e.g., an administrative user or an employee associated with a tenant) to define what metrics they would like to predict based on specified output conditions. That is, the user may use an AI model to predict purchase, churn, conversion, and other propensity scores for particular products, product categories, and the like. The AI model may use inputs including a scoring audience (who may be evaluated), a training audience (for training the AI model), and relevant entities and attributes associated with the audiences. When the AI model is configured, the user may view output quality and propensity score distributions for their customers, and once satisfied with the results, may choose to publish the model and enable it for use in segmenting entities based on the propensity scores. In this way, users may use custom propensity scores to create segments, where the users may customize their propensity predictions according to different scenarios.

Specifically, a data service (e.g., CDP) may receive a first user input at a user interface associated with the data service that manages a data model of entities. The first user input may indicate a selection of a first set of entities of the entities for training an AI model. The data service may receive a second user input indicating a selection of a set of outcome conditions associated with the first set of entities, the set of outcome conditions defining an output of the AI model based on a set of input data associated with the first set of entities. In some examples, the data service may generate the AI model based on the set of outcome conditions and the input data. Based on executing the AI model, the data service may generate a set of prediction metrics (e.g., propensity scores) for a second set of entities, and the set of prediction metrics may correspond to the set of outcome conditions. In some aspects, the data service may store an indication of the generated set of prediction metrics in association with the second set of entities in the data model, and may generate a segment of entities of the second set of entities based on the indication of the generated set of prediction metrics.

Generating segments based on propensity scores, as described herein, may support improved workflow efficiencies and improved customer experience. For example, as the techniques described herein support generating an AI model for propensity score prediction based on a set of input data and user-defined outcome conditions, the techniques may support a templated model builder experience that reduces required coding. Additionally, as the techniques described herein support generating prediction metrics based on executing the AI model and generating a segment of entities using the prediction metrics, the techniques may support improved segmentation that is specific to the prediction metrics, enabling more targeted marketing and improved customer experience as customers receive intended content at correct times.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
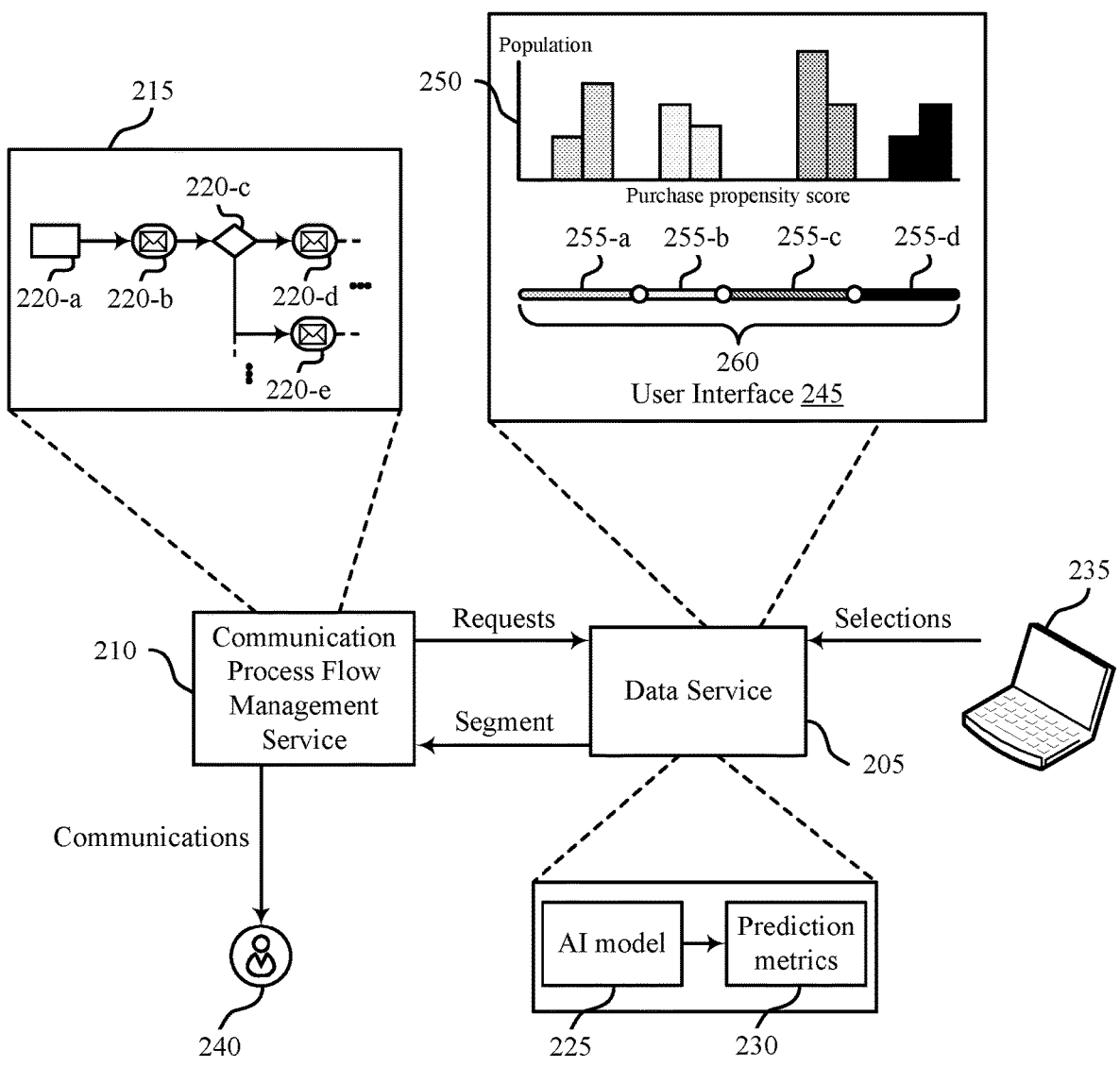
FIG. 2 illustrates an example of a computing architecture that supports generating segments based on propensity scores configured via a templated model builder experience in accordance with aspects of the present disclosure.

FIG. 2 illustrates an example of a computing architecture 200 that supports generating segments based on propensity scores configured via a templated model builder experience in accordance with aspects of the present disclosure. The computing architecture 200 includes a data service 205, a communication process flow management service 210, and a user device 235. Each of the data service 205 and the communication process flow management service 210 may be implemented in respective servers. In some cases, the server that supports the communication process flow management service 210 may represent aspects of the cloud platform 115 and subsystem 125 of FIG. 1. The data service 205 may also be implemented in aspects of the cloud platform 115 and subsystem 125 of FIG. 1. The systems supporting the data service 205 may be a logically or physical separate computing systems from the systems supporting the communication process flow management service 210.

As described herein, the communication process flow management service 210 may support creation, configuration, and implementation of various communication process flow (e.g., a communication process flow 215) that controls electronic communications between a tenant and a set of users associated with the tenant. For example, users associated with the tenant may use the communication process flow management service 210 to configure actions (e.g., actions 220) that are associated with processor executable instructions for management of electronic communications. For example, action 220-a may be associated with instructions that are used to filter users into the communication process flow 215. That is, action 220-a may define a rule that is used to determine whether a user of a set of users (e.g., associated with a tenant) is to receive electronic communications based on the communication process flow 215. The rule may be based on attribute data and/or web behavior data. For example, users that have purchased a product from the tenant organization in the last six months may receive electronic communications from the tenant based on the communication process flow 215. Users that do not satisfy this rule may not "enter" this example communication process flow 215.

Other actions 220 define message transmissions, decision splits, and other processes. For example, each user that satisfies the rule of action 220-a may receive an email according to action 220-b. The action 220-b may be associated with specific content that is to be emailed to the users. Action 220-c may define a decision split between users. For example, users that opened the email corresponding to action 220-b may be routed to action 220-d, while users that did not open the email corresponding to action 220-b may be routed to action 220-e. Additionally, or alternatively, the decision split action 220-c may consider attribute data associated with users, web behavior data (e.g., web page interaction), among other parameters, to route users through the communication process flow 215.

The data service 205 may support segmentation of entities (e.g., including an entity 240) based on attributes associated with the entities, where the attributes may be identified by ingesting data from multiple data sources such as email records, mobile application data, geolocation data, website activity, profile data, among other data sources. Such data may be referred to herein as user engagement data. In addition, the data service 205 may support a data model of multiple entities, which may enable the data from the multiple data sources to be segmented and analyzed. Users of a tenant or an organization (e.g., a marketing team) may store large amounts of records and user profiles in the data service 205. A schema of the data model (e.g., a Cloud Information Model (CIM)) and attribute data stored at the data service 205 may be available for use in the communication process flow 215. For example, a user of the tenant may use the data model of the data service 205 or the attribute data to configure actions 220 of the communication process flow 215 and route users (e.g., customers, subscribers) via a particular path of the communication process flow. There are direct relationships between attributes (e.g., one-to-one relationships), such as a first name (e.g., a user has only one first name). There may also be indirect or one-to-many relationships between attributes (e.g., a user may be associated with multiple product purchases). The schema may define whether an attribute is a direct or indirect attribute. As described herein, based on the schema, an expression of an action 220 may be defined. Thus, the schema may be requested for and received based on an action configuration.

Propensity scoring may enable end users (e.g., marketers) to determine their customers' behaviors and improve marketing targeted to them. For example, if a user is developing the communication process flow 215 (e.g., a marketing campaign) using the communication process flow management service 210, the user may use propensity scoring to determine who is most likely to make a specific purchase, churn (e.g., stop using or purchasing a particular product), convert (e.g., start using or purchasing a particular product), and the like. Moreover, the techniques described herein enable users to build AI models using templates without code, where the models may output propensity scores. The data service 205 may use different input data to build the AI models and generate propensity scores. For example, for purchase propensity scores (e.g., the likelihood that a customer will purchase a specific product), an AI model template may be based on purchase history, channel engagement (e.g., email, text message, and other ecommerce activity), product information (e.g., product price, stock keeping unit (SKU) numbers, etc.), customer demographic data (e.g., income, location, and other user information used for segmentation), and other demographic behavioral data and product information.

To generate propensity scores, the data service 205 may also support an AI model 225 that analyzes communication data associated with the communication process flow supported by the communication process flow management service 210. The AI model 225 may be a templated, no-code model that generates prediction metrics 230 based on a set of user-defined outcome conditions and a set of input data. The AI model 225 may guide users (e.g., administrative users associated with a tenant such as a marketing team) to define goals (e.g., what the users would like to predict) by defining the outcome conditions from a predefined set of options with some customizability. The AI model 225 may consider input data including a scoring audience who is to be evaluated (e.g., defined by a user), a training audience for the AI model 225 (e.g., determined by the AI model 225 and in some cases, modifiable by the user), and relevant entities and attributes associated with each audience (e.g., determined by the AI model 225 and in some cases, modifiable by the user). Such a templated, no-code model builder experience may build and display the user's model definition based on the users selections, and build the model successfully once the user has indicated the relevant selections (e.g., input data, outcome conditions, and the like).

To generate a segment based on a set of predicted propensity scores (also referred to herein as prediction metrics 230), a user may configure and build the AI model 225 using the data service 205. The user may indicate a type of model the user would like to build, which may correspond to a no-code, model template. For example, the user may indicate a purchase propensity model that may help understand the likelihood that a customer will make a purchase in the next 20 days. In addition, the user may select a scoring audience and a training audience, which the user may indicate to the data service 205. For example, the data service 205 may receive, at a user interface, a first user input indicating a selection of a first set of entities of the multiple entities of the data model for training the AI model 225. In some cases, a user may indicate the first user input via a user device 235. The first set of entities, which may include one or multiple entities, may correspond to a training audience on which the AI model 225 may be trained.

Additionally, the first user input may indicate a set of input data for the AI model 225, where the set of input data may include a set of attributes associated with the first set of entities. In some cases, the user may select to include or exclude particular attributes for building the AI model 225. Additionally, or alternatively, the user may add additional entities to include in the scoring audience for the AI model 225. The training audience may be selected by a user or configured in the data service 205. In addition, the training audience may be the audience the data service 205 may use to identify patterns which may contribute to making a prediction. In some examples, the data service 205 may use the scoring audience as the training audience.

After configuring the scoring and training audiences, the user may define an outcome or a specific goal of generating and executing the AI model 225. In some examples, the user may define the outcome by including one or more conditions that are relevant to achieving the goal in the AI model 225. The data service 205 may receive, at the user interface, a second user input (e.g., from a user via the user device 235) indicating a selection of a set of outcome conditions associated with the first set of entities. The set of outcome conditions may define an output of the AI model 225 based on the set of input data. In some aspects, the data service 205 may provide the user with a set of predefined outcome conditions that may range in their degree of customization. That is, the data service 205 may generate the set of outcome conditions, where the second user input may indicate the selection based on the generated set of outcome conditions. For example, for purchase propensity scores, the outcome conditions may include an any purchase condition (e.g., where the AI model 225 may predict a likelihood of a customer making any purchase) or a product purchase condition (e.g., where the AI model 225 may predict a likelihood of a customer making a purchase in a specific product category). Such outcome conditions may be included in the no-code templates associated with the AI model 225. In some examples, the user may select customized outcome conditions. Additionally, or alternatively, based on the scoring audience and the outcome conditions configured by the user, the data service 205 may provide a list of preselected entities and attributes for building the AI model 225.

When the user selects the scoring and target audiences, the set of input data (e.g., including attributes), and the set of outcome conditions, the data service 205 may display a final definition of the AI model 225 to the user before the data service 205 generates the model. As the user progresses through different steps of the model builder experience described herein, the data service 205 may display a summary of the model configuration completed up to that point. For each step, a summary card may review the inputs selected or defined by the user and quickly reflect that information back to the user via a user interface. That is, the data service 205 may display, at a user interface of the data service 205 (which the user may view via the user device 235), a model progress indicator including a summary of the generated AI model 225, where the summary indicates the first user input and the second user input. The model progress indicator may enable the user to understand all the information that has been configured in each step of the model builder experience in one location.

The data service 205 may generate the AI model 225 based on the set of outcome conditions and the set of input data. In some examples, generating the AI model 225 may include training the AI model 225 using the first set of entities and the first set of attributes. The data service 205 may then execute the AI model 225 to generate a set of prediction metrics 230 (e.g., propensity scores) for a second set of entities. As the AI model 225 was trained on the information indicated via the first and second user inputs, the set of prediction metrics 230 may correspond to the set of outcome conditions. For example, if an outcome condition included a product purchase condition, the set of prediction metrics 230 may indicate a likelihood of a customer making a purchase in a specific product category.

In some examples, the data service 205 may store an indication of the generated set of prediction metrics 230 in association with the second set of entities in the data model of the data service 205. The data service 205 may display a model record that may enable the user to view a quality of the model and the propensity scores (and in some cases, a propensity score distribution) for the second set of entities, which may correspond to a set of customers. The user may review the model quality and propensity scores prior to publishing the AI model 225 and the generated propensity scores in case the user is to make changes to the AI model 225. In some examples, the model record may indicate the propensity scores (e.g., insights) and information about them, such as an insight name (e.g., Promo Purchase 2018, Holiday Purchase, etc.), a tool that generated the propensity scores (e.g., Builder), a status (e.g., pending, ready, enabled, draft, error, etc.), a last run date, a creator, and a created data, among other information.

In some examples, the model quality may indicate whether the AI model 225 is trained well-enough to output accurate prediction metrics 230. For example, a model quality may indicate whether there is enough relevant data (e.g., enough data depth and data length) to build the AI model 225 to make accurate propensity score predictions. For example, if the AI model 225 generates purchase propensity scores based on data only for the month of December (when people are shopping more than other times of the year), the model quality may be relatively poor as the purchase propensity scores may be inflated, for example, as compared to scores based on data only for the month of January. As such, contextual information from customers' engagement and purchase history is critical to building a high-quality model. The data service 205 may determine a model quality (e.g., good, bad, etc.) based on executing the AI model 225 on an audience other than the training audience. The AI model 225 may be continually (e.g., daily, weekly, monthly) updated based on customer information as customers' behavioral patterns shift to maintain a high model quality.

Additionally, the model record may indicate a set of predictors associated with the set of propensity scores, such as a quantity of days since a last purchase, a quantity of distinct products purchased, a quantity of days since a last product view, and the like. The predictors may include factors which may contribute to or detract from a customer's propensity to purchase a product.

In some cases, the user may view, via a user interface 245, a score distribution 250 corresponding to their customers (e.g., the second set of entities) to understand a quantity of customers that may belong to a particular propensity score category 255. That is, based on executing the AI model 225, the data service 205 may generate a distribution of entities of the second set of entities relative to a set of thresholds corresponding to the generated set of prediction metrics 230. The set of thresholds may include a least likely threshold that defines a least likely category 255-*a*, a less likely threshold that defines a less likely category 255-*b*, a more likely threshold that defines a more likely category 255-*c*, a most likely threshold that defines a most likely category 255-*d*, or any combination thereof. Alternatively, the distribution may be based on a different set of categories 255. While the data service 205 may provide default thresholds for these categories 255, the user may edit the thresholds by entering values in an "Edit Threshold" tool or by using a threshold slider 260. For example, a user may adjust the span of each category 255 by sliding indicators (e.g., indicator 265) on the threshold slider 260. In some cases, the second user input may indicate the set of thresholds (e.g., defined by the user).

As the propensity scores may range from 0% (e.g., the customer will never make a purchase) to 100% (e.g., the customer will definitely make a purchase), the thresholds may also correspond to likelihood percentages (e.g., 80% differentiates a more likely threshold from a most likely threshold). While the AI model 225 may output the percentages associated with the thresholds, a user may edit these thresholds to update how many customers fall into each category and build a segment based on such categories. In some cases, the user may edit the thresholds in the "Edit Threshold" tool using a multi-slider interface. For example, the user may move the thresholds along a scale from 0% to 100% using a graphical slider. In some examples, the data service 205 may generate the set of prediction metrics 230 in accordance with the distribution of the segment of entities.

When the user is satisfied with the model quality and generated set of propensity scores, the user may choose to publish the AI model 225 and enable it for use in entity segmentation (e.g., in a segment builder). In this way, the user is effectively appending a propensity score (or propensity score categories or thresholds) to each individual or unified individual included in the data service 205 that is relevant to the AI model 225. As such, the techniques described herein provide a sandboxed approach to generating the propensity scores. Once the user publishes the propensity scores, the user may use the scores as attributes when building a new segment.

Based on the indication of the generated set of prediction metrics 230, and once the user indicates to publish the AI model 225, the data service 205 may generate a segment of entities of the second set of entities. That is, the user may use the data service 205 and a segment builder tool to generate the segment of entities based on corresponding propensity scores. The data service may add a new attribute to the segment that corresponds to the propensity scores. Further, these propensity scores and/or the propensity score categories may be used by the communication process flow 215. For example, the decision split action 220-*c* may consider determine whether the user is "more likely" to purchase, and route the user to action 220-*d*. Similarly, if the user is considered least likely, then the user may be routed to action 220-*e*.

Figure 3:
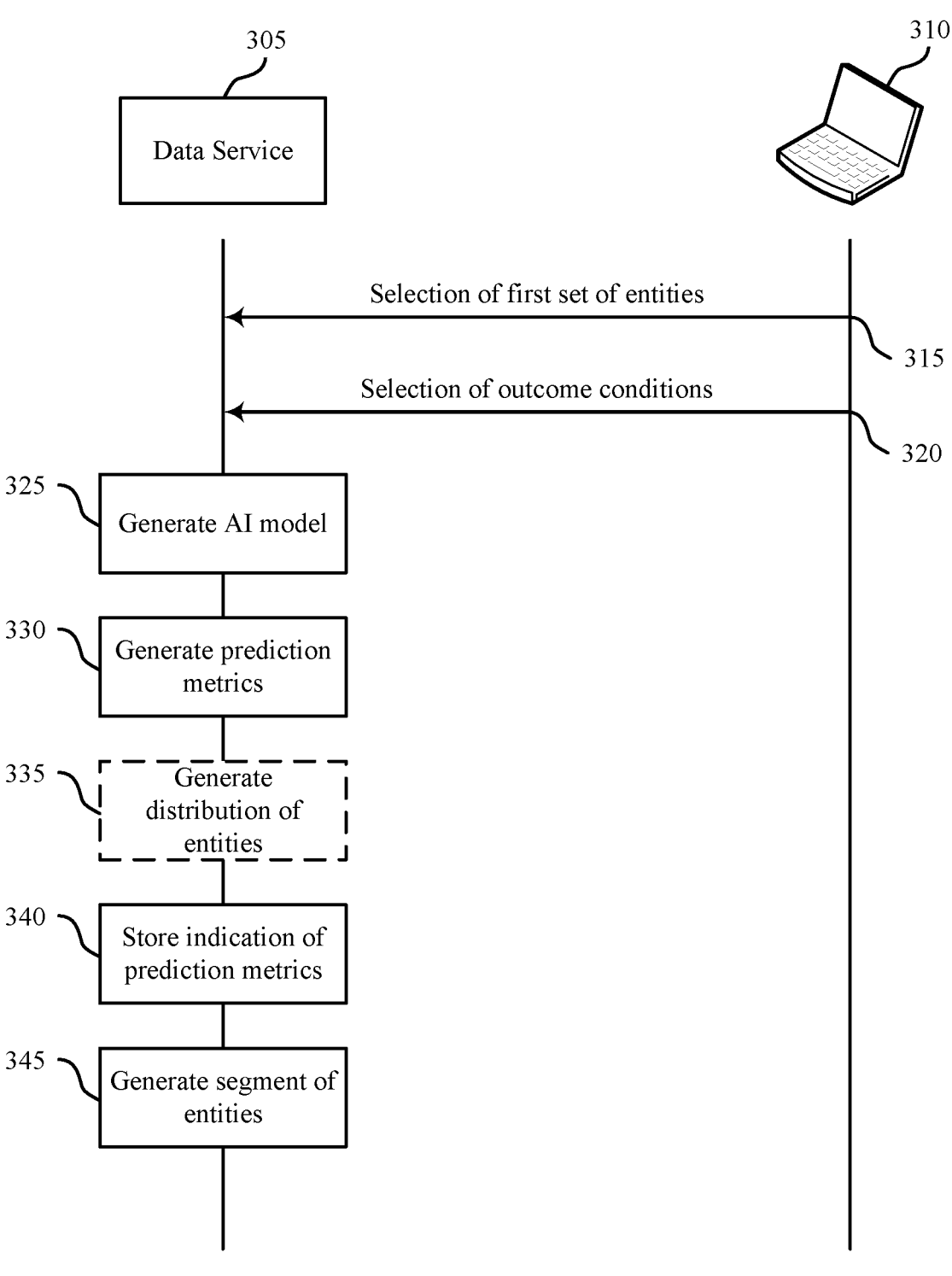
FIG. 3 illustrates an example of a process flow that supports generating segments based on propensity scores configured via a templated model builder experience in accordance with aspects of the present disclosure.

FIG. 3 illustrates an example of a process flow 300 that supports generating segments based on propensity scores configured via a templated model builder experience in accordance with aspects of the present disclosure. The process flow 300 may implement aspects of the data processing system 100 and the computing architecture 200, or may be implemented by aspects of the data processing system 100 and the computing architecture 200. The process flow 300 may include a data service 305 and a user device 310. In the following description of the process flow 300, the operations between the data service 305 and the user device 310 may be performed in different orders or at different times. Some operations may also be left out of the process flow 300, or other operations may be added. Although the data service 305 and the user device 310 are shown performing the operations of the process flow 300, some aspects of some operations may also be performed by one or more other devices, or may be performed by other devices included in the process flow.

At 315, the data service 305 may receive, at a user interface associated with the data service that manages a data model of a set of multiple entities, a first user input from a user via a user device 310. The first user input may indicate a selection of a first set of entities of the set of multiple entities for training an AI model. The first set of entities may correspond to a training audience, and may be associated with a set of attributes.

At 320, the data service 305 may receive, at the user interface and from the user via the user device 310, a second user input indicating a selection of a set of outcome conditions associated with the first set of entities, where the set of outcome conditions define an output of the AI model based on a set of input data associated with the first set of entities. An outcome condition may correspond to goals or what a user would like to predict about a customer. For example, an outcome condition may be an any purchase condition, which may predict a likelihood of a customer making any purchase.

At 325, the data service 305 may generate the AI model based on the set of outcome conditions and the set of input data. That is, the AI model may include user defined or indicated inputs such that the AI model is a no-code, templated model.

At 330, the data service 305 may generate, based on execution of the AI model, a set of prediction metrics for a second set of entities, the set of prediction metrics corresponding to the set of outcome conditions. That is, the AI model may predict propensity scores associated with a scoring audience (e.g., the second set of users) based on the information input into the AI model. For example, a purchase propensity score may indicate a likelihood of a customer to purchase a particular product.

At 335, the data service 305 may generate, based on executing the AI model, a distribution of entities of the second set of entities relative to a set of multiple thresholds corresponding to the generated set of prediction metrics. For example, the data service 305 may display multiple propensity score categories based on thresholds (e.g., least likely, less likely, more likely, most likely) and may indicate which customers are in each category, which a user may use to determine a quality of the AI model.

At 340, the data service 305 may store an indication of the generated set of prediction metrics (or propensity score categories) in association with the second set of entities in the data model. That is, the data service may display a model record that shows the user the model quality, a set of predictors, the distribution of entities, and the propensity scores, among other information associated with the AI model.

At 345, the data service 305 may generate, using the data service and based on the indication of the generated set of prediction metrics, a segment of entities of the second set of entities. The data service 305 may generate the segment of entities based on the propensity scores when the user is satisfied with the quality of the AI model and the generated propensity scores and has published the AI model to the data service 305.

Figure 4:
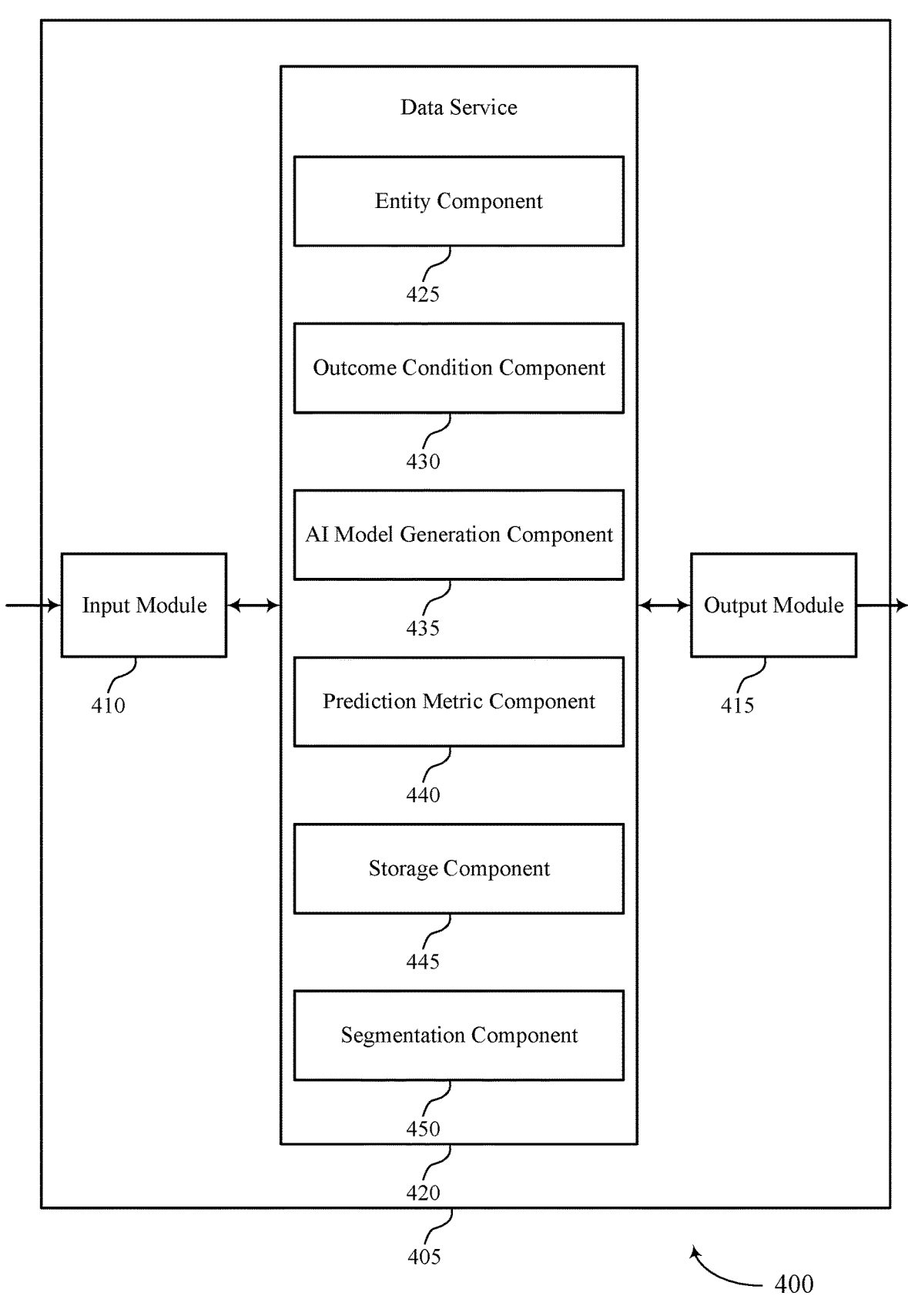
FIG. 4 illustrates a block diagram of an apparatus that supports generating segments based on propensity scores configured via a templated model builder experience in accordance with aspects of the present disclosure.

FIG. 4 illustrates a block diagram 400 of a device 405 that supports generating segments based on propensity scores configured via a templated model builder experience in accordance with aspects of the present disclosure. The device 405 may include an input module 410, an output module 415, and a data service 420. The device 405 may also include a processor. Each of these components may be in communication with one another (e.g., via one or more buses).

The input module 410 may manage input signals for the device 405. For example, the input module 410 may identify input signals based on an interaction with a modem, a keyboard, a mouse, a touchscreen, or a similar device. These input signals may be associated with user input or processing at other components or devices. In some cases, the input module 410 may utilize an operating system such as iOS®, ANDROID®, MS-DOS®, MS-WINDOWS®, OS/2®, UNIX®, LINUX®, or another known operating system to handle input signals. The input module 410 may send aspects of these input signals to other components of the device 405 for processing. For example, the input module 410 may transmit input signals to the data service 420 to support generating segments based on propensity scores configured via a templated model builder experience. In some cases, the input module 410 may be a component of an I/O controller 610 as described with reference to FIG. 6.

The output module 415 may manage output signals for the device 405. For example, the output module 415 may receive signals from other components of the device 405, such as the data service 420, and may transmit these signals to other components or devices. In some examples, the output module 415 may transmit output signals for display in a user interface, for storage in a database or data store, for further processing at a server or server cluster, or for any other processes at any number of devices or systems. In some cases, the output module 415 may be a component of an I/O controller 610 as described with reference to FIG. 6.

For example, the data service 420 may include an entity component 425, an outcome condition component 430, an AI model generation component 435, a prediction metric component 440, a storage component 445, a segmentation component 450, or any combination thereof. In some examples, the data service 420, or various components thereof, may be configured to perform various operations (e.g., receiving, monitoring, transmitting) using or otherwise in cooperation with the input module 410, the output module 415, or both. For example, the data service 420 may receive information from the input module 410, send information to the output module 415, or be integrated in combination with the input module 410, the output module 415, or both to receive information, transmit information, or perform various other operations as described herein.

The data service 420 may support data processing in accordance with examples as disclosed herein. The entity component 425 may be configured to support receiving, at a user interface associated with a data service that manages a data model of a set of multiple entities, a first user input indicating a selection of a first set of entities of the set of multiple entities for training an AI model. The outcome condition component 430 may be configured to support receiving, at the user interface, a second user input indicating a selection of a set of outcome conditions associated with the first set of entities, where the set of outcome conditions define an output of the AI model based on a set of input data associated with the first set of entities. The AI model generation component 435 may be configured to support generating the AI model based on the set of outcome conditions and the set of input data. The prediction metric component 440 may be configured to support generating, based on execution of the AI model, a set of prediction metrics for a second set of entities, the set of prediction metrics corresponding to the set of outcome conditions. The storage component 445 may be configured to support storing an indication of the generated set of prediction metrics in association with the second set of entities in the data model. The segmentation component 450 may be configured to support generating, using the data service and based on the indication of the generated set of prediction metrics, a segment of entities of the second set of entities.

Figure 5:
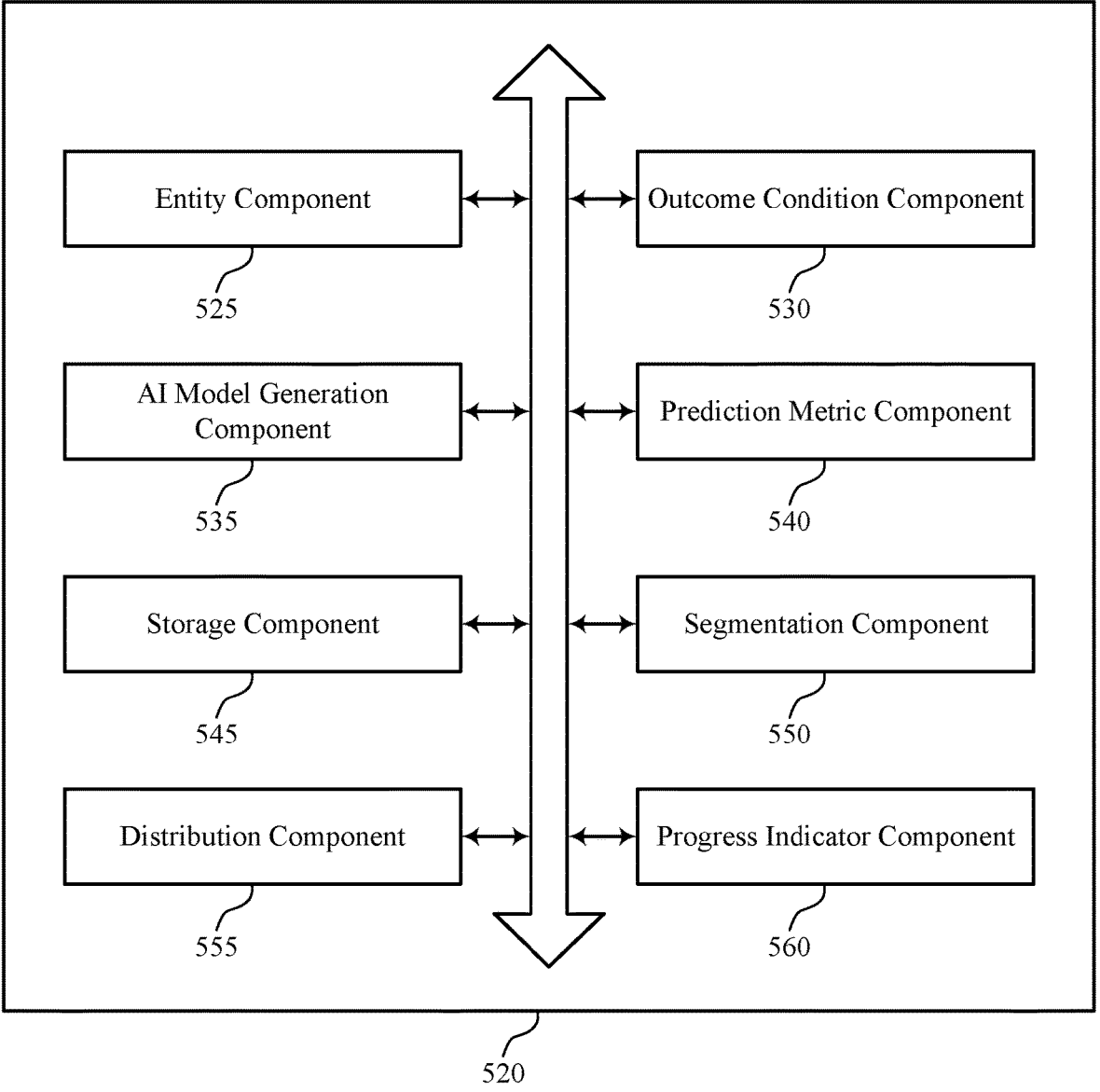
FIG. 5 illustrates a block diagram of a data service that supports generating segments based on propensity scores configured via a templated model builder experience in accordance with aspects of the present disclosure.

FIG. 5 illustrates a block diagram 500 of a data service 520 that supports generating segments based on propensity scores configured via a templated model builder experience in accordance with aspects of the present disclosure. The data service 520 may be an example of aspects of a data service or a data service 420, or both, as described herein. The data service 520, or various components thereof, may be an example of means for performing various aspects of generating segments based on propensity scores configured via a templated model builder experience as described herein. For example, the data service 520 may include an entity component 525, an outcome condition component 530, an AI model generation component 535, a prediction metric component 540, a storage component 545, a segmentation component 550), a distribution component 555, a progress indicator component 560, or any combination thereof. Each of these components may communicate, directly or indirectly, with one another (e.g., via one or more buses).

The data service 520 may support data processing in accordance with examples as disclosed herein. The entity component 525 may be configured to support receiving, at a user interface associated with a data service that manages a data model of a set of multiple entities, a first user input indicating a selection of a first set of entities of the set of multiple entities for training an AI model. The outcome condition component 530 may be configured to support receiving, at the user interface, a second user input indicating a selection of a set of outcome conditions associated with the first set of entities, where the set of outcome conditions define an output of the AI model based on a set of input data associated with the first set of entities. The AI model generation component 535 may be configured to support generating the AI model based on the set of outcome conditions and the set of input data. The prediction metric component 540) may be configured to support generating, based on execution of the AI model, a set of prediction metrics for a second set of entities, the set of prediction metrics corresponding to the set of outcome conditions. The storage component 545 may be configured to support storing an indication of the generated set of prediction metrics in association with the second set of entities in the data model. The segmentation component 550) may be configured to support generating, using the data service and based on the indication of the generated set of prediction metrics, a segment of entities of the second set of entities.

In some examples, the distribution component 555 may be configured to support generating, based on executing the AI model, a distribution of entities of the second set of entities relative to a set of multiple thresholds corresponding to the generated set of prediction metrics.

In some examples, the prediction metric component 540 may be configured to support generating the set of prediction metrics in accordance with the distribution of the segment of entities.

In some examples, the set of multiple thresholds include a least likely threshold, a less likely threshold, a more likely threshold, a most likely threshold, or any combination thereof. In some examples, the outcome condition component 530 may be configured to support receiving the second user input indicating the set of multiple thresholds.

In some examples, the progress indicator component 560 may be configured to support displaying, at the user interface, a model progress indicator including a summary of the generated AI model, where the summary indicates the first user input and the second user input.

In some examples, the outcome condition component 530 may be configured to support generating, at the user interface, the set of outcome conditions associated with the first set of entities. In some examples, the outcome condition component 530 may be configured to support receiving, at the user interface, the second user input indicating the selection of the set of outcome conditions based on generating the set of outcome conditions.

In some examples, to support receiving the first user input, the entity component 525 may be configured to support receiving the first user input indicating the set of input data, where the set of input data includes a set of attributes associated with the first set of entities. In some examples, to support receiving the first user input, the AI model generation component 535 may be configured to support training the AI model using the first set of entities and the set of attributes.

Figure 6:
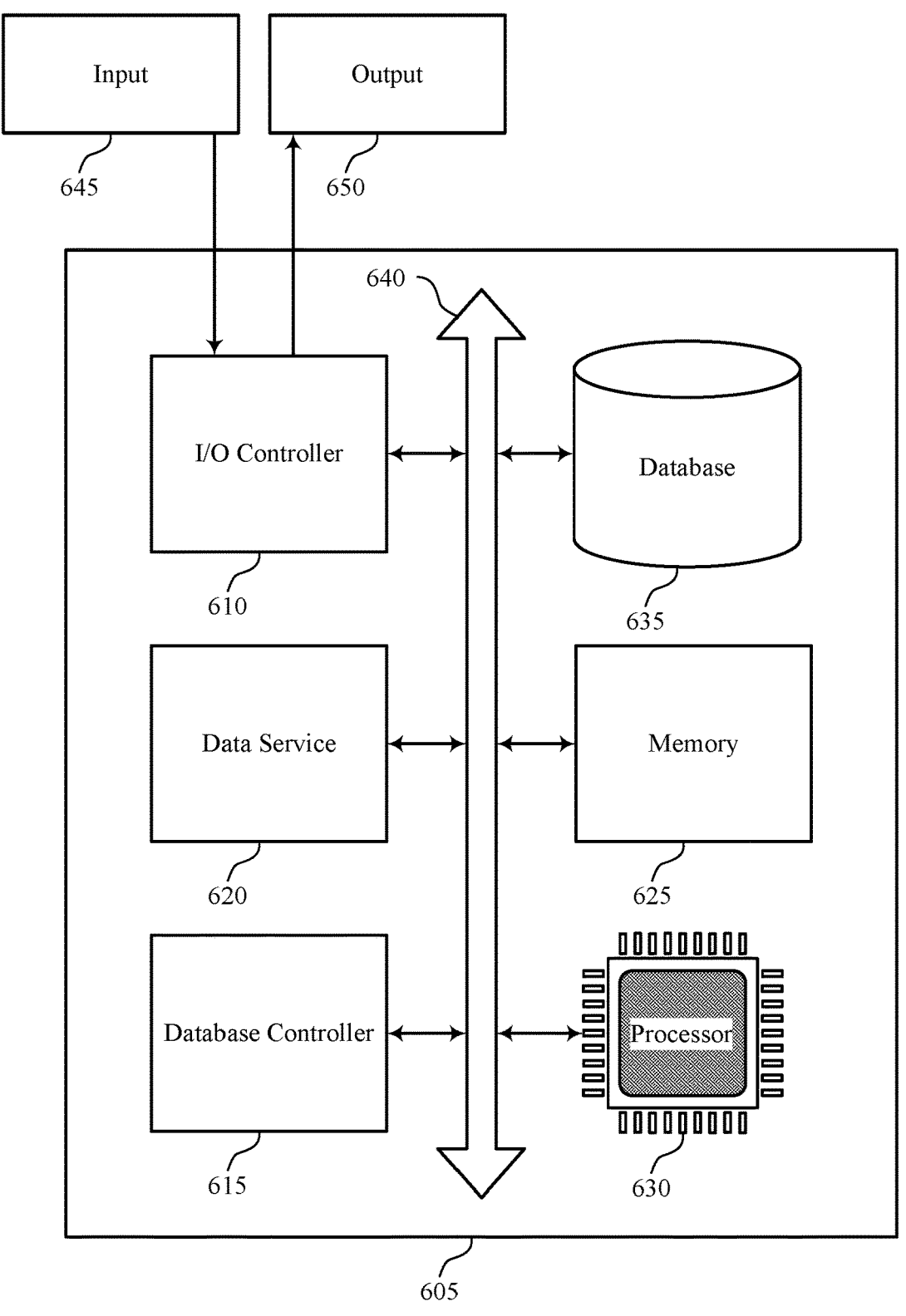
FIG. 6 illustrates a diagram of a system including a device that supports generating segments based on propensity scores configured via a templated model builder experience in accordance with aspects of the present disclosure.

FIG. 6 illustrates a diagram of a system 600 including a device 605 that supports generating segments based on propensity scores configured via a templated model builder experience in accordance with aspects of the present disclosure. The device 605 may be an example of or include the components of a device 405 as described herein. The device 605 may include components for bi-directional data communications including components for transmitting and receiving communications, such as a data service 620, an I/O controller 610, a database controller 615, a memory 625, a processor 630, and a database 635. These components may be in electronic communication or otherwise coupled (e.g., operatively, communicatively, functionally, electronically, electrically) via one or more buses (e.g., a bus 640).

The I/O controller 610 may manage input signals 645 and output signals 650 for the device 605. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. In other cases, the I/O controller 610 may represent or interact with a modem, a keyboard, a mouse, a touchscreen, or a similar device. In some cases, the I/O controller 610 may be implemented as part of a processor 630. In some examples, a user may interact with the device

605 via the I/O controller 610 or via hardware components controlled by the I/O controller 610.

The database controller 615 may manage data storage and processing in a database 635. In some cases, a user may interact with the database controller 615. In other cases, the database controller 615 may operate automatically without user interaction. The database 635 may be an example of a single database, a distributed database, multiple distributed databases, a data store, a data lake, or an emergency backup database.

Memory 625 may include random-access memory (RAM) and ROM. The memory 625 may store computer-readable, computer-executable software including instructions that, when executed, cause the processor 630 to perform various functions described herein. In some cases, the memory 625 may contain, among other things, a BIOS which may control basic hardware or software operation such as the interaction with peripheral components or devices.

The processor 630 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 630 may be configured to operate a memory array using a memory controller. In other cases, a memory controller may be integrated into the processor 630. The processor 630 may be configured to execute computer-readable instructions stored in a memory 625 to perform various functions (e.g., functions or tasks supporting generating segments based on propensity scores configured via a templated model builder experience).

The data service 620 may support data processing in accordance with examples as disclosed herein. For example, the data service 620 may be configured to support receiving, at a user interface associated with a data service that manages a data model of a set of multiple entities, a first user input indicating a selection of a first set of entities of the set of multiple entities for training an AI model. The data service 620 may be configured to support receiving, at the user interface, a second user input indicating a selection of a set of outcome conditions associated with the first set of entities, where the set of outcome conditions define an output of the AI model based on a set of input data associated with the first set of entities. The data service 620 may be configured to support generating the AI model based on the set of outcome conditions and the set of input data. The data service 620 may be configured to support generating, basing at least in part on execution of the AI model, a set of prediction metrics for a second set of entities, the set of prediction metrics corresponding to the set of outcome conditions. The data service 620 may be configured to support storing an indication of the generated set of prediction metrics in association with the second set of entities in the data model. The data service 620 may be configured to support generating, using the data service and based on the indication of the generated set of prediction metrics, a segment of entities of the second set of entities.

By including or configuring the data service 620 in accordance with examples as described herein, the device 605 may support techniques for generating segments based on propensity scores configured via a templated model builder experience, which may improve the accuracy of AI model outputs, improve marketing campaigns, and improve customer and user experiences.

FIG. 7 illustrates a flowchart showing a method 700 that supports generating segments based on propensity scores configured via a templated model builder experience in accordance with aspects of the present disclosure. The operations of the method 700 may be implemented by a data platform or its components as described herein. For example, the operations of the method 700 may be performed by a data platform as described with reference to FIGS. 1 through 6. In some examples, a data platform may execute a set of instructions to control the functional elements of the data platform to perform the described functions. Additionally, or alternatively, the data platform may perform aspects of the described functions using special-purpose hardware.

At 705, the method may include receiving, at a user interface associated with a data service that manages a data model of a set of multiple entities, a first user input indicating a selection of a first set of entities of the set of multiple entities for training an AI model. The operations of 705 may be performed in accordance with examples as disclosed herein. In some examples, aspects of the operations of 705 may be performed by an entity component 525 as described with reference to FIG. 5.

At 710, the method may include receiving, at the user interface, a second user input indicating a selection of a set of outcome conditions associated with the first set of entities, where the set of outcome conditions define an output of the AI model based on a set of input data associated with the first set of entities. The operations of 710 may be performed in accordance with examples as disclosed herein. In some examples, aspects of the operations of 710 may be performed by an outcome condition component 530 as described with reference to FIG. 5.

At 715, the method may include generating the AI model based on the set of outcome conditions and the set of input data. The operations of 715 may be performed in accordance with examples as disclosed herein. In some examples, aspects of the operations of 715 may be performed by an AI model generation component 535 as described with reference to FIG. 5.

At 720, the method may include generating, based on execution of the AI model, a set of prediction metrics for a second set of entities, the set of prediction metrics corresponding to the set of outcome conditions. The operations of 720 may be performed in accordance with examples as disclosed herein. In some examples, aspects of the operations of 720 may be performed by a prediction metric component 540 as described with reference to FIG. 5.

At 725, the method may include storing an indication of the generated set of prediction metrics in association with the second set of entities in the data model. The operations of 725 may be performed in accordance with examples as disclosed herein. In some examples, aspects of the operations of 725 may be performed by a storage component 545 as described with reference to FIG. 5.

At 730, the method may include generating, using the data service and based on the indication of the generated set of prediction metrics, a segment of entities of the second set of entities. The operations of 730 may be performed in accordance with examples as disclosed herein. In some examples, aspects of the operations of 730 may be performed by a segmentation component 550 as described with reference to FIG. 5.

Figure 8:
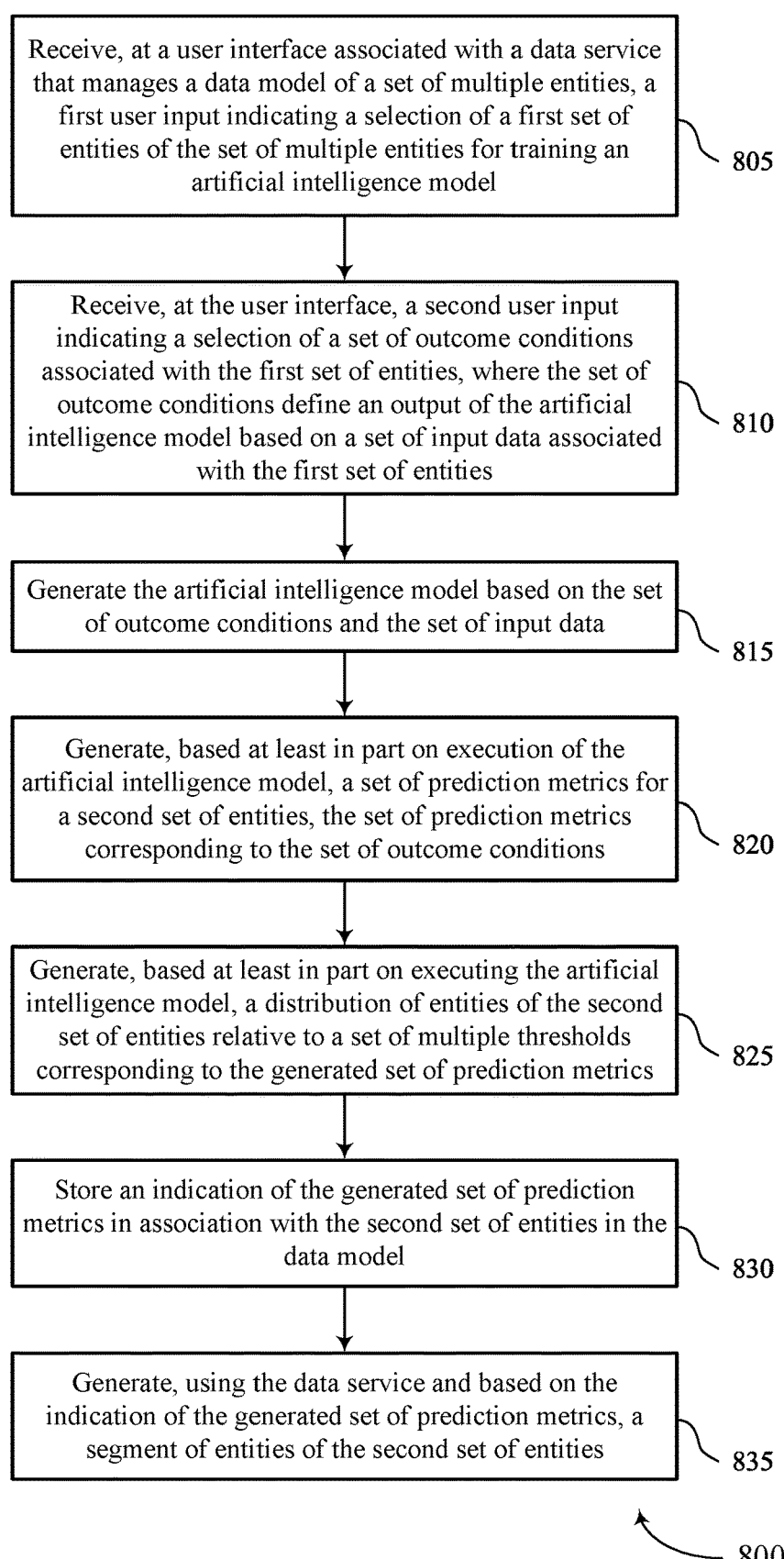

FIG. 8 illustrates a flowchart showing a method 800 that supports generating segments based on propensity scores configured via a templated model builder experience in accordance with aspects of the present disclosure. The operations of the method 800 may be implemented by a data platform or its components as described herein. For example, the operations of the method 800 may be performed by a data platform as described with reference to FIGS. 1 through 6. In some examples, a data platform may execute a set of instructions to control the functional elements of the data platform to perform the described functions. Additionally, or alternatively, the data platform may perform aspects of the described functions using special-purpose hardware.

At 805, the method may include receiving, at a user interface associated with a data service that manages a data model of a set of multiple entities, a first user input indicating a selection of a first set of entities of the set of multiple entities for training an AI model. The operations of 805 may be performed in accordance with examples as disclosed herein. In some examples, aspects of the operations of 805 may be performed by an entity component 525 as described with reference to FIG. 5.

At 810, the method may include receiving, at the user interface, a second user input indicating a selection of a set of outcome conditions associated with the first set of entities, where the set of outcome conditions define an output of the AI model based on a set of input data associated with the first set of entities. The operations of 810 may be performed in accordance with examples as disclosed herein. In some examples, aspects of the operations of 810 may be performed by an outcome condition component 530 as described with reference to FIG. 5.

At 815, the method may include generating the AI model based on the set of outcome conditions and the set of input data. The operations of 815 may be performed in accordance with examples as disclosed herein. In some examples, aspects of the operations of 815 may be performed by an AI model generation component 535 as described with reference to FIG. 5.

At 820, the method may include generating, based on execution of the AI model, a set of prediction metrics for a second set of entities, the set of prediction metrics corresponding to the set of outcome conditions. The operations of 820 may be performed in accordance with examples as disclosed herein. In some examples, aspects of the operations of 820 may be performed by a prediction metric component 540 as described with reference to FIG. 5.

At 825, the method may include generating, based on executing the AI model, a distribution of entities of the second set of entities relative to a set of multiple thresholds corresponding to the generated set of prediction metrics. The operations of 825 may be performed in accordance with examples as disclosed herein. In some examples, aspects of the operations of 825 may be performed by a distribution component 555 as described with reference to FIG. 5.

At 830, the method may include storing an indication of the generated set of prediction metrics in association with the second set of entities in the data model. The operations of 830 may be performed in accordance with examples as disclosed herein. In some examples, aspects of the operations of 830 may be performed by a storage component 545 as described with reference to FIG. 5.

At 835, the method may include generating, using the data service and based on the indication of the generated set of prediction metrics, a segment of entities of the second set of entities. The operations of 835 may be performed in accordance with examples as disclosed herein. In some examples, aspects of the operations of 835 may be performed by a segmentation component 550 as described with reference to FIG. 5.

FIG. 9 illustrates a flowchart showing a method 900 that supports generating segments based on propensity scores configured via a templated model builder experience in accordance with aspects of the present disclosure. The operations of the method 900 may be implemented by a data platform or its components as described herein. For example, the operations of the method 900 may be performed by a data platform as described with reference to FIGS. 1 through 6. In some examples, a data platform may execute a set of instructions to control the functional elements of the data platform to perform the described functions. Additionally, or alternatively, the data platform may perform aspects of the described functions using special-purpose hardware.

At 905, the method may include receiving, at a user interface associated with a data service that manages a data model of a set of multiple entities, a first user input indicating a selection of a first set of entities of the set of multiple entities for training an AI model. The operations of 905 may be performed in accordance with examples as disclosed herein. In some examples, aspects of the operations of 905 may be performed by an entity component 525 as described with reference to FIG. 5.

At 910, the method may include receiving, at the user interface, a second user input indicating a selection of a set of outcome conditions associated with the first set of entities, where the set of outcome conditions define an output of the AI model based on a set of input data associated with the first set of entities. The operations of 910 may be performed in accordance with examples as disclosed herein. In some examples, aspects of the operations of 910 may be performed by an outcome condition component 530 as described with reference to FIG. 5.

At 915, the method may include generating the AI model based on the set of outcome conditions and the set of input data. The operations of 915 may be performed in accordance with examples as disclosed herein. In some examples, aspects of the operations of 915 may be performed by an AI model generation component 535 as described with reference to FIG. 5.

At 920, the method may include generating, based on execution of the AI model, a set of prediction metrics for a second set of entities, the set of prediction metrics corresponding to the set of outcome conditions. The operations of 920 may be performed in accordance with examples as disclosed herein. In some examples, aspects of the operations of 920 may be performed by a prediction metric component 540 as described with reference to FIG. 5.

At 925, the method may include storing an indication of the generated set of prediction metrics in association with the second set of entities in the data model. The operations of 925 may be performed in accordance with examples as disclosed herein. In some examples, aspects of the operations of 925 may be performed by a storage component 545 as described with reference to FIG. 5.

At 930, the method may include displaying, at the user interface, a model progress indicator including a summary of the generated AI model, where the summary indicates the first user input and the second user input. The operations of 930 may be performed in accordance with examples as disclosed herein. In some examples, aspects of the operations of 930 may be performed by a progress indicator component 560 as described with reference to FIG. 5.

At 935, the method may include generating, using the data service and based on the indication of the generated set of prediction metrics, a segment of entities of the second set of entities. The operations of 935 may be performed in accordance with examples as disclosed herein. In some examples, aspects of the operations of 935 may be performed by a segmentation component 550 as described with reference to FIG. 5.

A method for data processing is described. The method may include receiving, at a user interface associated with a data service that manages a data model of a set of multiple entities, a first user input indicating a selection of a first set of entities of the set of multiple entities for training an AI model, receiving, at the user interface, a second user input indicating a selection of a set of outcome conditions associated with the first set of entities, where the set of outcome conditions define an output of the AI model based on a set of input data associated with the first set of entities, generating the AI model based on the set of outcome conditions and the set of input data, generating, based on execution of the AI model, a set of prediction metrics for a second set of entities, the set of prediction metrics corresponding to the set of outcome conditions, storing an indication of the generated set of prediction metrics in association with the second set of entities in the data model, and generating, using the data service and based on the indication of the generated set of prediction metrics, a segment of entities of the second set of entities.

An apparatus for data processing is described. The apparatus may include a processor, memory coupled with the processor, and instructions stored in the memory. The instructions may be executable by the processor to cause the apparatus to receive, at a user interface associated with a data service that manages a data model of a set of multiple entities, a first user input indicating a selection of a first set of entities of the set of multiple entities for training an AI model, receive, at the user interface, a second user input indicating a selection of a set of outcome conditions associated with the first set of entities, where the set of outcome conditions define an output of the AI model based on a set of input data associated with the first set of entities, generate the AI model based on the set of outcome conditions and the set of input data, generating, based at least in part on execution of the AI model, a set of prediction metrics for a second set of entities, the set of prediction metrics corresponding to the set of outcome conditions, store an indication of the generated set of prediction metrics in association with the second set of entities in the data model, and generating, using the data service and based on the indication of the generated set of prediction metrics, a segment of entities of the second set of entities.

Another apparatus for data processing is described. The apparatus may include means for receiving, at a user interface associated with a data service that manages a data model of a set of multiple entities, a first user input indicating a selection of a first set of entities of the set of multiple entities for training an AI model, means for receiving, at the user interface, a second user input indicating a selection of a set of outcome conditions associated with the first set of entities, where the set of outcome conditions define an output of the AI model based on a set of input data associated with the first set of entities, means for generating the AI model based on the set of outcome conditions and the set of input data, means for generating, based on execution of the AI model, a set of prediction metrics for a second set of entities, the set of prediction metrics corresponding to the set of outcome conditions, means for storing an indication of the generated set of prediction metrics in association with the second set of entities in the data model, and means for generating, using the data service and based on the indication of the generated set of prediction metrics, a segment of entities of the second set of entities.

A non-transitory computer-readable medium storing code for data processing is described. The code may include instructions executable by a processor to receive, at a user interface associated with a data service that manages a data model of a set of multiple entities, a first user input indicating a selection of a first set of entities of the set of multiple entities for training an AI model, receive, at the user interface, a second user input indicating a selection of a set of outcome conditions associated with the first set of entities, where the set of outcome conditions define an output of the AI model based on a set of input data associated with the first set of entities, generate the AI model based on the set of outcome conditions and the set of input data, generating, based at least in part on execution of the AI model, a set of prediction metrics for a second set of entities, the set of prediction metrics corresponding to the set of outcome conditions, store an indication of the generated set of prediction metrics in association with the second set of entities in the data model, and generating, using the data service and based on the indication of the generated set of prediction metrics, a segment of entities of the second set of entities.

In some examples of the method, apparatuses, and non-transitory computer-readable medium described herein, generating, based on executing the AI model, a distribution of entities of the second set of entities relative to a set of multiple thresholds corresponding to the generated set of prediction metrics.

Some examples of the method, apparatuses, and non-transitory computer-readable medium described herein may further include operations, features, means, or instructions for generating the set of prediction metrics in accordance with the distribution of the segment of entities.

In some examples of the method, apparatuses, and non-transitory computer-readable medium described herein, the set of multiple thresholds include a least likely threshold, a less likely threshold, a more likely threshold, a most likely threshold, or any combination thereof.

Some examples of the method, apparatuses, and non-transitory computer-readable medium described herein may further include operations, features, means, or instructions for receiving the second user input indicating the set of multiple thresholds.

Some examples of the method, apparatuses, and non-transitory computer-readable medium described herein may further include operations, features, means, or instructions for displaying, at the user interface, a model progress indicator including a summary of the generated AI model, where the summary indicates the first user input and the second user input.

In some examples of the method, apparatuses, and non-transitory computer-readable medium described herein, generating, at the user interface, the set of outcome conditions associated with the first set of entities and receiving, at the user interface, the second user input indicating the selection of the set of outcome conditions based on generating the set of outcome conditions.

In some examples of the method, apparatuses, and non-transitory computer-readable medium described herein, receiving the first user input may include operations, features, means, or instructions for receiving the first user input indicating the set of input data, where the set of input data includes a set of attributes associated with the first set of entities and training the AI model using the first set of entities and the set of attributes.

The following provides an overview of aspects of the present disclosure:

Aspect 1: A method for data processing, comprising: receiving, at a user interface associated with a data service that manages a data model of a plurality of entities, a first user input indicating a selection of a first set of entities of the plurality of entities for training an AI model; receiving, at the user interface, a second user input indicating a selection of a set of outcome conditions associated with the first set of entities, wherein the set of outcome conditions define an output of the AI model based at least in part on a set of input data associated with the first set of entities; generating the AI model based at least in part on the set of outcome conditions and the set of input data; generating, based at least in part on execution of the AI model, a set of prediction metrics for a second set of entities, the set of prediction metrics corresponding to the set of outcome conditions; storing an indication of the generated set of prediction metrics in association with the second set of entities in the data model; and generating, using the data service and based at least in part on the indication of the generated set of prediction metrics, a segment of entities of the second set of entities.

Aspect 2: The method of aspect 1, further comprising: generating, based at least in part on executing the AI model, a distribution of entities of the second set of entities relative to a plurality of thresholds corresponding to the generated set of prediction metrics.

Aspect 3: The method of aspect 2, further comprising: generating the set of prediction metrics in accordance with the distribution of the segment of entities.

Aspect 4: The method of any of aspects 2 through 3, wherein the plurality of thresholds comprise a least likely threshold, a less likely threshold, a more likely threshold, a most likely threshold, or any combination thereof.

Aspect 5: The method of any of aspects 2 through 4, further comprising: receiving the second user input indicating the plurality of thresholds.

Aspect 6: The method of any of aspects 1 through 5, further comprising: displaying, at the user interface, a model progress indicator comprising a summary of the generated AI model, wherein the summary indicates the first user input and the second user input.

Aspect 7: The method of any of aspects 1 through 6, further comprising: generating, at the user interface, the set of outcome conditions associated with the first set of entities; and receiving, at the user interface, the second user input indicating the selection of the set of outcome conditions based at least in part on generating the set of outcome conditions.

Aspect 8: The method of any of aspects 1 through 7, wherein receiving the first user input comprises: receiving the first user input indicating the set of input data, wherein the set of input data comprises a set of attributes associated with the first set of entities; and training the AI model using the first set of entities and the set of attributes.

Aspect 9: An apparatus for data processing, comprising a processor; memory coupled with the processor; and instructions stored in the memory and executable by the processor to cause the apparatus to perform a method of any of aspects 1 through 8.

Aspect 10: An apparatus for data processing, comprising at least one means for performing a method of any of aspects 1 through 8.

Aspect 11: A non-transitory computer-readable medium storing code for data processing, the code comprising instructions executable by a processor to perform a method of any of aspects 1 through 8.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
   receiving, at a user interface associated with a data service that manages a data model of a plurality of entities, a first user input indicating a selection of a first set of entities of the plurality of entities for training an artificial intelligence model, wherein the first set of entities corresponds to one or more users;
   receiving, at the user interface, a second user input indicating a selection of a set of outcome conditions associated with the first set of entities, the second user input being different from the first user input, wherein the set of outcome conditions define an output of the artificial intelligence model based at least in part on a set of input data associated with the first set of entities;
   generating the artificial intelligence model based at least in part on the set of outcome conditions and the set of input data, wherein the artificial intelligence model is generated to indicate that the set of input data satisfies the set of outcome conditions;
   generating, based at least in part on execution of the artificial intelligence model, a set of prediction metrics for a second set of entities, the set of prediction metrics corresponding to the set of outcome conditions;

storing an indication of the generated set of prediction metrics in association with the second set of entities in the data model; and generating, using the data service and based at least in part on the indication of the generated set of prediction metrics, a segment of entities of the second set of entities.

2. The method of claim 1, further comprising:

generating, based at least in part on executing the artificial intelligence model, a distribution of entities of the second set of entities relative to a plurality of thresholds corresponding to the generated set of prediction metrics.

3. The method of claim 2, further comprising:

generating the set of prediction metrics in accordance with the distribution of the segment of entities.

4. The method of claim 2, wherein the plurality of thresholds comprises a least likely threshold, a less likely threshold, a more likely threshold, a most likely threshold, or any combination thereof.

5. The method of claim 2, further comprising:

receiving the second user input indicating the plurality of thresholds.

6. The method of claim 1, further comprising:

displaying, at the user interface, a model progress indicator comprising a summary of the generated artificial intelligence model, wherein the summary indicates the first user input and the second user input.

7. The method of claim 1, further comprising:

generating, at the user interface, the set of outcome conditions associated with the first set of entities; and receiving, at the user interface, the second user input indicating the selection of the set of outcome conditions based at least in part on generating the set of outcome conditions.

8. The method of claim 1, wherein receiving the first user input comprises:

receiving the first user input indicating the set of input data, wherein the set of input data comprises a set of attributes associated with the first set of entities; and training the artificial intelligence model using the first set of entities and the set of attributes.

9. An apparatus for data processing, comprising:

a processor;

memory coupled with the processor; and instructions stored in the memory and executable by the processor to cause the apparatus to:

receive, at a user interface associated with a data service that manages a data model of a plurality of entities, a first user input indicating a selection of a first set of entities of the plurality of entities for training an artificial intelligence model, wherein the first set of entities corresponds to one or more users;

receive, at the user interface, a second user input indicating a selection of a set of outcome conditions associated with the first set of entities, wherein the second user input is different from the first user input, and wherein the set of outcome conditions define an output of the artificial intelligence model based at least in part on a set of input data associated with the first set of entities;

generate the artificial intelligence model based at least in part on the set of outcome conditions and the set of input data, wherein the artificial intelligence model is generated to indicate that the set of input data satisfies the set of outcome conditions;

generate, based at least in part on execution of the artificial intelligence model, a set of prediction metrics for a second set of entities, the set of prediction metrics corresponding to the set of outcome conditions;

store an indication of the generated set of prediction metrics in association with the second set of entities in the data model; and generate, using the data service and based at least in part on the indication of the generated set of prediction metrics, a segment of entities of the second set of entities.

10. The apparatus of claim 9, wherein the instructions are further executable by the processor to cause the apparatus to:

generate, based at least in part on executing the artificial intelligence model, a distribution of entities of the second set of entities relative to a plurality of thresholds corresponding to the generated set of prediction metrics.

11. The apparatus of claim 10, wherein the instructions are further executable by the processor to cause the apparatus to:

generate the set of prediction metrics in accordance with the distribution of the segment of entities.

12. The apparatus of claim 10, wherein the plurality of thresholds comprises a least likely threshold, a less likely threshold, a more likely threshold, a most likely threshold, or any combination thereof.

13. The apparatus of claim 10, wherein the instructions are further executable by the processor to cause the apparatus to:

receive the second user input indicating the plurality of thresholds.

14. The apparatus of claim 9, wherein the instructions are further executable by the processor to cause the apparatus to:

display, at the user interface, a model progress indicator comprising a summary of the generated artificial intelligence model, wherein the summary indicates the first user input and the second user input.

15. The apparatus of claim 9, wherein the instructions are further executable by the processor to cause the apparatus to:

generate, at the user interface, the set of outcome conditions associated with the first set of entities; and receive, at the user interface, the second user input indicating the selection of the set of outcome conditions based at least in part on generating the set of outcome conditions.

16. The apparatus of claim 9, wherein the instructions to receive the first user input are executable by the processor to cause the apparatus to:

receive the first user input indicating the set of input data, wherein the set of input data comprises a set of attributes associated with the first set of entities; and train the artificial intelligence model using the first set of entities and the set of attributes.

17. A non-transitory computer-readable medium storing code for data processing, the code comprising instructions executable by a processor to:

receive, at a user interface associated with a data service that manages a data model of a plurality of entities, a first user input indicating a selection of a first set of entities of the plurality of entities for training an artificial intelligence model, wherein the first set of entities corresponds to one or more users;

receive, at the user interface, a second user input indicating a selection of a set of outcome conditions associated with the first set of entities, the second user input being different from the first user input, wherein the set of outcome conditions define an output of the artificial intelligence model based at least in part on a set of input data associated with the first set of entities;

generate the artificial intelligence model based at least in part on the set of outcome conditions and the set of input data, wherein the artificial intelligence model is generated to indicate that the set of input data satisfies the set of outcome conditions;

generate, based at least in part on execution of the artificial intelligence model, a set of prediction metrics for a second set of entities, the set of prediction metrics corresponding to the set of outcome conditions;

store an indication of the generated set of prediction metrics in association with the second set of entities in the data model; and generate, used the data service and based at least in part on the indication of the generated set of prediction metrics, a segment of entities of the second set of entities.

18. The non-transitory computer-readable medium of claim 17, wherein the instructions are further executable by the processor to:

generate, based at least in part on executing the artificial intelligence model, a distribution of entities of the second set of entities relative to a plurality of thresholds corresponding to the generated set of prediction metrics.

19. The non-transitory computer-readable medium of claim 18, wherein the instructions are further executable by the processor to:

generate the set of prediction metrics in accordance with the distribution of the segment of entities.

20. The non-transitory computer-readable medium of claim 18, wherein the plurality of thresholds comprises a least likely threshold, a less likely threshold, a more likely threshold, a most likely threshold, or any combination thereof.

\* \* \* \* \*